United States Patent
Tang

(10) Patent No.: US 10,979,989 B2
(45) Date of Patent: Apr. 13, 2021

(54) METHOD FOR RESOURCE ALLOCATION, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 16 days.

(21) Appl. No.: 16/363,182

(22) Filed: Mar. 25, 2019

(65) Prior Publication Data
US 2019/0223123 A1 Jul. 18, 2019

Related U.S. Application Data

(63) Continuation of application No. PCT/CN2018/098141, filed on Aug. 1, 2018.

(30) Foreign Application Priority Data

Oct. 30, 2017 (WO) ................ PCT/CN2017/108421
Apr. 25, 2018 (WO) ................ PCT/CN2018/084497

(51) Int. Cl.
*H04W 56/00* (2009.01)
*H04W 72/04* (2009.01)

(52) U.S. Cl.
CPC ......... *H04W 56/001* (2013.01); *H04W 72/04* (2013.01); *H04W 72/0406* (2013.01)

(58) Field of Classification Search
CPC ................ H04W 56/001; H04W 72/0406; H04W 72/04
See application file for complete search history.

(56) References Cited

U.S. PATENT DOCUMENTS

| 9,918,290 B2 * | 3/2018 | Li .................. H04W 8/005 |
| 2014/0328329 A1 | 11/2014 | Novlan et al. |

(Continued)

FOREIGN PATENT DOCUMENTS

| CN | 102882262 A | 1/2013 |
| CN | 105246066 A | 1/2016 |

(Continued)

OTHER PUBLICATIONS

3GPP TS 36.331 V13.7.0 (Sep. 2017), 16 pages (Year: 2017).*
(Continued)

*Primary Examiner* — Alex Skripnikov
*Assistant Examiner* — Sharmin Chowdhury

(57) ABSTRACT

Embodiments of the present application relate to a method for resource allocation, a network device, and a terminal device. The method includes allocating, by the network device, multiple receiving resource pools corresponding to different synchronization references to the terminal device, where the multiple receiving resource pools are used by the terminal device to receive data transmitted by a further terminal device; determining, by the network device, at least one receiving resource pool in the multiple receiving resources; transmitting, by the network device, a system information block (SIB) to the terminal device, where the SIB is used to indicate the at least one receiving resource pool.

18 Claims, 6 Drawing Sheets

(56) References Cited

U.S. PATENT DOCUMENTS

| | | | | |
|---|---|---|---|---|
| 2016/0219640 | A1* | 7/2016 | Jung | H04B 17/318 |
| 2016/0302249 | A1 | 10/2016 | Sheng | |
| 2017/0099624 | A1 | 4/2017 | Baghel et al. | |
| 2019/0037430 | A1* | 1/2019 | Lee | H04W 76/14 |
| 2019/0098589 | A1* | 3/2019 | Chae | H04W 56/0015 |
| 2019/0104450 | A1* | 4/2019 | Adachi | H04W 72/04 |
| 2019/0222983 | A1* | 7/2019 | Adachi | H04W 76/27 |

FOREIGN PATENT DOCUMENTS

| | | | |
|---|---|---|---|
| CN | 105338548 | A | 2/2016 |
| CN | 105940621 | A | 9/2016 |
| CN | 105993201 | A | 10/2016 |
| CN | 106465314 | A | 2/2017 |
| CN | 06538045 | A | 3/2017 |
| CN | 106793090 | A | 5/2017 |
| CN | 107079430 | A | 8/2017 |
| WO | 2016021963 | A1 | 2/2016 |
| WO | 2016/159715 | A2 | 10/2016 |
| WO | 2017/007285 | A1 | 1/2017 |

OTHER PUBLICATIONS

Intel Corporation (Rapporteur); "Report of email discussion [93bis#25] Mobility for V2V" 3GPP TSG-RAN WG2 #94, R2-163620 27,5; May 27, 2016; 10 pages.

Huawei, Hisilicon; "Interface Selection between PC5 and Uu", 3GPP TSG RAN WG2 Meeting #95-bis, R2-166301 Oct. 14, 2016: 3 pages.

Samsung; "V2X Multi-carrier operation: mode 4 operation enhancement" 3GPP TSG-RAN WG@ #97, R2-1701355 Feb. 17, 2017, 3 pages, 1. Introduction. 2 Discussion.

The International Search Report dated Jul. 25, 2018; PCT/CN2017/108421.

The International Search Report dated Aug. 3, 2018; PCT/CN2018/084497.

The International Search Report dated Oct. 16, 2018; PCT/CN2018/098141.

Huawei et al. 3GPP TSG-RAN WG2 Meeting #99bis R2-1711859; Corrections to V2X in TS 36.300; published on Oct. 13, 2017.

The First Office Action of corresponding Chinese application No. 201880003363.7, dated Mar. 9, 2020.

The Notification of Rejection of corresponding Taiwan,dated Mar. 4, 2020.

The first examination report of parallel TW application dated Oct. 7, 2019.

Qualcomm Incorporated, Samsung, R2; "Introduction of ProSe", 3GPP TSG-RAN WG2 #87, R-143672, Dresden, Germany, Aug. 18-Aug. 22, 2014, 20 pages.

The Extended European Search Report dated Jul. 25, 2019; Appln. No. 18847230.2.

Huawei, CATT, LG Electronics, HiSilicon, China Unicorn, RP-171069, Revision of WI: "V2X phase 2 based on LTE", published on Jun. 5, 2017, 6 pages.

The First Office Action of corresponding Chilean application No. 201902541, dated Nov. 16, 2020.

* cited by examiner

100

A network device allocates multiple receiving resource pools for a terminal device, where the multiple receiving resource pools correspond to different synchronization reference sources, and the multiple receiving resource pools are used by the terminal device to receive data transmitted by a further terminal device ⸺ S110

The network device determines at least one receiving resource pool in the multiple receiving resource pools ⸺ S120

The network device transmits an SIB to the terminal device, where the SIB is used to indicate the at least one receiving resource pool ⸺ S130

A terminal device receives an SIB transmitted by a network device ⸺ S210

The terminal device determines, according to the SIB, at least one receiving resource pool in multiple receiving resource pools allocated by the network device, where the multiple receiving resource pools are used by the terminal device to receive data transmitted by a further terminal device ⸺ S220

A network device determines parameter information of a terminal device, where the terminal device supports performing side-link communication in a first format and a second format, and the parameter information includes at least one parameter for the terminal device to perform the side-link communication in the first format and the second format — S910

The network device transmits the parameter information to the terminal device, where the parameter information is used by the terminal device to determine the at least one parameter — S920

A terminal device receives parameter information transmitted by a network device, where the terminal device supports performing side-link communication in a first format and a second format, and the parameter information includes at least one parameter for the terminal device to perform the side-link communication in the first format and the second format — S1010

The terminal device determines, according to the parameter information, the at least one parameter corresponding to the first format and the at least one parameter corresponding to the second format — S1020

FIG. 10

METHOD FOR RESOURCE ALLOCATION, NETWORK DEVICE AND TERMINAL DEVICE

CROSS-REFERENCE TO RELATED APPLICATIONS

This application is a continuation application of the International Application No. PCT/CN2018/098141, filed on Aug. 1, 2018, entitled "METHOD FOR RESOURCE ALLOCATION, NETWORK DEVICE AND TERMINAL DEVICE", which claims priorities to the International Application No. PCT/CN2017/108421, filed with the Chinese Patent Office on Oct. 30, 2017, entitled "METHOD FOR RESOURCE ALLOCATION, NETWORK DEVICE, AND TERMINAL DEVICE", and the International Application No. PCT/CN2018/084497, filed with Chinese Patent Office on Apr. 25, 2018, entitled "METHOD FOR RESOURCE ALLOCATION, NETWORK DEVICE AND TERMINAL DEVICE", all of which are hereby incorporated by reference in their entireties.

TECHNICAL FIELD

The present application relates to the field of communications and, in particular, to a method for resource allocation, a network device, and a terminal device.

BACKGROUND

In a vehicle to X (V2X) scenario, a network device may indicate, through a system information block (SIB), a receiving resource pool to the terminal, where the receiving resource pool is used by a terminal device to communicate with a further terminal device.

Specifically, when the network device configures a receiving resource pool for the terminal device, the network device may indicate the receiving resource pool through an SIB, where a synchronization reference (sync reference) corresponding to the receiving resource pool may be determined by the terminal device according to a synchronization reference signal transmitted by the network device. However, when the network device configures multiple receiving resource pools for the terminal device, for example, the multiple receiving resource pools correspond to different synchronization references, and the different synchronization references may be determined by the terminal according to reference signals of the different network devices, due to a size limitation of the SIB, it is not possible to indicate all receiving resource pools through the SIB.

In addition, the network device may also transmit parameter information to the terminal device through the SIB. Specifically, the SIB may include multiple parameters used by at least one terminal device in side-link communications, but it is not possible to transmit multiple parameters of all terminal devices through the SIB due to the size limitation of the SIB. Moreover, when the terminal device supports multiple working modes, for example, when a terminal device of a higher release is compatible with a working mode of a lower release, the network device also needs to determine the working mode of the terminal device, and then transmit information including a corresponding parameter to the terminal device, thus the terminal device lacks flexibility in selecting a working mode in side-link communications.

SUMMARY

The present application provides a method for resource allocation, a network device, and a terminal device, which can flexibly configure a receiving resource pool for a terminal device.

A first aspect provides a method for resource allocation, including: allocating, by a network device, multiple receiving resource pools for a terminal device, where the multiple receiving resource pools correspond to different synchronization references, and the multiple receiving resource pools are used by the terminal device to receive data transmitted by a further terminal device; determining, by the network device, at least one receiving resource pool in the multiple receiving resource pools; transmitting, by the network device, an SIB to the terminal device, where the SIB is used to indicate the at least one receiving resource pool.

A second aspect provides a method for resource allocation, including: receiving, by a terminal device, an SIB transmitted by a network device; and determining, by the terminal device, according to the SIB, at least one receiving resource pool in multiple receiving resource pools allocated by the network device, where the multiple receiving resource pools are used by the terminal device to receive data transmitted by a further terminal device.

Therefore, in the method for resource allocation according to the embodiment of the present application, the terminal device receives the SIB transmitted by the network device, and determines at least one receiving resource pool according to the SIB, and may allocate the receiving resource pool to the terminal device in an idle state. Besides, the receiving resource pool may also be determined according to dedicated RRC signaling, for example, when a synchronization reference determined by the terminal device in the idle state according to a synchronization reference signal does not belong to the synchronization reference corresponding to the at least one receiving resource pool indicated by the SIB, the terminal device can switch from the idle state to a connected state, receive the dedicated RRC signaling, and determine the receiving resource pool indicated by the dedicated RRC signaling, thereby avoiding that the terminal device being in the idle state cannot be indicated only through the dedicated RRC signaling, and also avoiding limitation on a size of the SIB, thus achieving flexible configuration of the receiving resource pool.

A third aspect provides a method for parameter configuration, including: determining, by a network device, a first system information block (SIB) and a second SIB, where the first SIB and the second SIB are used by at least one terminal device to determine at least one parameter in side-link communication; transmitting, by the network device, the first SIB and the second SIB to the at least one terminal device.

A fourth aspect provides a method for parameter configuration, including: receiving, by a terminal device, a first system information block (SIB) and/or a second SIB transmitted by a network device; determining, by the terminal device, at least one parameter in side-link communication according to the received first SIB and/or the received second SIB.

Therefore, in the method for parameter configuration according to the embodiment of the present application, a network device transmits a first SIB and a second SIB to at least one terminal device, and for any of the at least one terminal device, the terminal device receives the first SIB and/or the second SIB, the terminal device may support performing side-link communication in one or more formats, and the terminal device may determine the corresponding at least one parameter according to the received first SIB and/or the received second SIB, and perform side-link communication according to the at least one parameter, so that the network device broadcasts different values of a parameter in different formats through the SIB, and enables the terminal device supporting different formats to obtain corresponding parameters, thereby implementing flexible parameter configuration.

A fifth aspect provides a method for parameter configuration, including: determining, by a network device, parameter information of a terminal device, where the terminal device supports performing side-link communication in a first format and a second format, and the parameter information includes at least one parameter for the terminal device to perform the side-link communication in the first format and the second format; transmitting, by the network device, the parameter information to the terminal device, where the parameter information is used by the terminal device to determine the at least one parameter.

A sixth aspect provides a method for parameter configuration, including: receiving, by a terminal device, parameter information transmitted by a network device, where the terminal device supports performing side-link communication in a first format and a second format, and the parameter information includes at least one parameter for the terminal device to perform the side-link communication in the first format and the second format; determining, by the terminal device, according to the parameter information, the at least one parameter corresponding to the first format and the at least one parameter corresponding to the second format.

Therefore, in the method for parameter configuration of the embodiment of the present application, a terminal device receives parameter information transmitted by a network device, and the terminal device can support performing side-link communication in the first format and the second format, and correspondingly, the parameter corresponding to the first format and the parameter value corresponding to the second format are included the parameter information, so that the terminal device can determine the parameters corresponding to the two formats according to the parameter information, thereby enabling the terminal device to select different formats to work and adopt corresponding parameters.

A seventh aspect provides a network device for performing the method according to any of the first, the third and the fifth aspects described above or the implementation manners thereof. Specifically, the network device includes functional modules for performing the method according to any of the first, the third, and the fifth aspects described above or the implementation manners thereof.

An eighth aspect provides a terminal device for performing the method according to any one of the second, the fourth and the sixth aspects described above or the implementation manners thereof. Specifically, the terminal device includes functional modules for performing the method according to any of the second, the fourth, and the sixth aspects described above or the implementation manners thereof.

A ninth aspect provides a network device, including: a storage unit and a processor, the storage unit is configured to store an instruction, the processor is configured to call and run the computer program stored in the memory, and perform the method according to any of the first, the third and the fifth aspects or the implementation manners thereof.

A tenth aspect provides a terminal device, including: a storage unit and a processor, the storage unit is configured to store an instruction, the processor is configured to call and run the computer program stored in the memory, and perform the method according to any of the second, the fourth and the sixth aspects or the implementation manners thereof.

An eleventh aspect provides a chip for implementing the method according to any of the first to sixth aspects or the implementation manners thereof. Specifically, the chip includes: a processor configured to call a computer program from a memory and run the computer program, causing the device on which the chip is mounted to perform the method of any one of the first to sixth aspects or the implementation manners thereof.

A twelfth aspect provides a computer readable storage medium for storing a computer program, the computer program causing a computer to perform the method according to any one of the first to sixth aspects or the implementation manners thereof.

A thirteenth aspect provides a computer program product, including a computer program instruction, the computer program instruction cause a computer to perform the method according to any one of the first to sixth aspects or the implementation manners thereof.

A fourteenth aspect provides a computer program, which, when being executed on a computer, causes the computer to perform the method according to any of the first to sixth aspects or the implementation manners thereof.

A fifteenth aspect provides a communication system, including a network device and a terminal device. Specifically, the network device is configured to perform the method according to any one of the first, the third, and the fifth aspects, or the implementation manners thereof, and the terminal device is configured to perform the method implementations any one of the second, the four and the sixth aspects or the implementation manners thereof.

BRIEF DESCRIPTION OF DRAWINGS

FIG. 1 is a schematic flowchart of a method for resource allocation according to an embodiment of the present application;

FIG. 2 is another schematic flowchart of a method for resource allocation according to an embodiment of the present application:

FIG. 9 is still another schematic flowchart of a method for parameter configuration according to an embodiment of the present application;

FIG. 10 is still another schematic flowchart of a method for parameter configuration according to an embodiment of the present application;

DETAILED DESCRIPTION OF EMBODIMENTS

Figure 3:
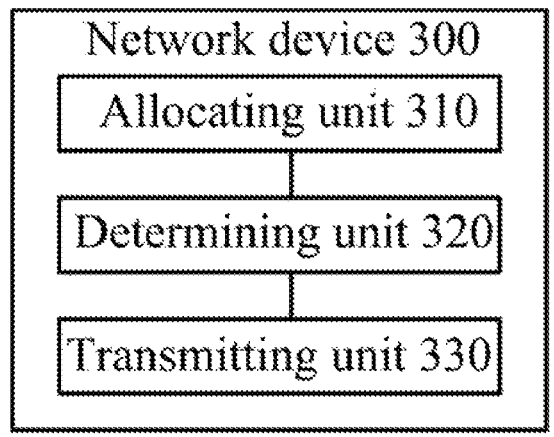
FIG. 3 is a schematic block diagram of a network device according to an embodiment of the present application.

The technical solutions in the embodiments of the present application will be described below with reference to the accompanying drawings.

The technical solutions in the embodiments of the present application can be applied to various communication systems, for example, a global system of mobile communication (GSMC) system, a code division multiple access (CDMA) system, a wideband code division multiple access (WCDMA) system, a general packet radio service (GPRS), a long term evolution (LTE) system, an LTE frequency division duplex (FDD) system, an LTE Time Division Duplex (TDD) system, a universal mobile telecommunication system (UMTS), a worldwide interoperability for microwave access (WiMAX) communication system, a future fifth generation (5th generation, 5G) system or a new radio (NR) or the like.

The terminal device in the embodiments of the present application may refer to a user equipment, an access terminal, a subscriber unit, a subscriber station, a mobile station, a mobile, a remote station, a remote terminal, a mobile device, a user terminal, a terminal, a wireless communication device, a user agent, or a user device. The terminal device may also be a cellular phone, a cordless phone, a session initiation protocol (SIP) phone, a wireless local loop (WLL) station, a personal digital assistant (PDA), a handheld device with wireless communication functions, a computing device, or other processing devices connected to wireless modems, in-vehicle devices, wearable devices, terminal devices in a future 5G network, or terminal devices in a future evolved public land mobile network (PLMN) or the like, which are not limited in the embodiments of the present application.

The network device in the embodiments of the present application may be a device communicating with the terminal device, where the network device may be a base transceiver station (BTS) in the GSMC system or CDMA, or a NodeB (NB) in the WCDMA system, or an evolutional NodeB (cNB or eNodeB) in the LTE system, or a wireless controller in a cloud radio access network (CRAN) scenario, alternatively, the network device may be a relay station, an access point, an in-vehicle device, a wearable device, and a network device in the future 5G network, or a network device in the future evolved PLMN network, which are not limited in the embodiments of the present application.

FIG. 1 shows a schematic flowchart of a method 100 for resource allocation according to an embodiment of the present application, where the method 100 may be performed by a network device. As shown in FIG. 1, the method 100 includes: S110, a network device allocates multiple receiving resource pools for a terminal device, where the multiple receiving resource pools correspond to different synchronization references, and the multiple receiving resource pools are used by the terminal device to receive data transmitted by a further terminal device; S120, the network device determines at least one receiving resource pool in the multiple receiving resource pools; S130, the network device transmits an SIB to the terminal device, where the SIB is used to indicate the at least one receiving resource pool.

In the embodiment of the present application, the network device allocates multiple receiving resource pools to the terminal device, and the multiple receiving resource pools may correspond to multiple synchronous reference sources, where the multiple synchronous reference sources are different synchronous reference sources. In an embodiment, the multiple receiving resource pools may be in a one-to-one correspondence with the multiple synchronization references, that is, there is no receiving resource pool in the multiple receiving resource pools corresponding to a same synchronization reference.

In the embodiment of the present application, the network device determines, in the multiple receiving resource pools, at least one receiving resource pool indicated through the SIB, in an embodiment, the network device may further determine the at least one receiving resource pool in the multiple receiving resource pools according to different synchronization references corresponding to the multiple receiving resource pools, or according to the number of the multiple receiving resource pools.

It should be understood that, in view of a terminal device in an idle state, a receiving resource pool of the terminal device cannot be indicated through dedicated radio resource control (RRC) signaling, so the terminal device in the idle state can be indicated through the SIB. However, due to a size limitation of the SIB, the receiving resource pool allocated by the network device to the terminal device may not be completely indicated through the SIB. Therefore, it may be considered that the multiple receiving resource pools are jointly indicated through the SIB and the dedicated RRC signaling. Specifically, for a further receiving resource pool of the multiple receiving resource pools determined by the network device except the at least one receiving resource indicated through the SIB, the network device may indicate the further receiving resource pool through the dedicated RRC signaling. In an embodiment, the synchronization reference corresponding to the at least one receiving resource pool indicated through the SIB is different from the synchronization reference corresponding to the further receiving resource pool indicated through the RRC.

As an embodiment, the multiple receiving resource pools may include a first receiving resource pool, and the first receiving resource pool corresponds to a first synchronization reference, where the first synchronization reference corresponds to a synchronization reference signal transmitted by a network device transmitting a BIS, that is, the terminal device may determine the first synchronization reference according to the synchronization reference signal transmitted by the network device. In an embodiment, the network device may indicate the first receiving resource pool through the SIB, that is, the at least one receiving resource pool indicated through the SIB includes the first receiving resource pool, instead of indicating the first receiving resource pool using the dedicated RRC signaling.

As an embodiment, the multiple receiving resource pools may include a global navigation satellite system (GNSS) receiving resource pool, where the GNSS receiving resource pool corresponds to a GNSS synchronization reference, and the GNSS synchronization reference corresponds to a GNSS signal transmitted by the GNSS, that is, the terminal device may determine the GNSS synchronization reference according to the synchronization signal transmitted by the GNSS. In an embodiment, the network device may indicate the GNSS receiving resource pool through the SIB, that is, the at least one receiving resource pool indicated through the SIB includes the GNSS receiving resource pool, instead of indicating the GNSS receiving resource pool using the dedicated RRC signaling.

In an embodiment, the GNSS receiving resource pool may be a global positioning system (GPS) receiving resource pool. Correspondingly, the GPS receiving resource pool corresponds to a GPS synchronization reference, where the GPS synchronization reference corresponds to a GPS signal transmitted by the GPS, that is, the terminal device may determine the GPS synchronization reference according to the synchronization signal transmitted by the GPS.

It should be understood that when only the first receiving resource pool or only the GNSS receiving resource pool is included in the multiple receiving resource pools, the network device may indicate the first receiving resource pool or the GNSS receiving resource pool only through the SIB. When the first receiving resource pool and the GNSS receiving resource pool are included in the multiple receiving resource pools, the network device may indicate the first receiving resource pool and the GNSS receiving resource pool only through the SIB; or indicate the first receiving resource pool and the GNSS receiving resource pool through the SIB and the dedicated RRC signaling jointly, for example, indicating the first receiving resource pool through the SIB and indicating the GNSS receiving resource pool through the dedicated RRC signaling, or indicating the GNSS receiving resource pool through the SIB and indicating the first receiving resource pool through the dedicated RRC signaling, but the embodiment of the present application is not limited thereto.

As an embodiment, the multiple receiving resource pools may further include at least one second receiving resource pool, the at least one second receiving resource pool corresponds to at least one second synchronization reference, the at least one second receiving resource pool may be in one-to-one correspondence with the at least one second synchronization reference. The at least one second synchronization reference corresponds to a synchronization reference signal transmitted by at least one neighboring network device of the network device, that is, the terminal device determines the at least one synchronization reference according to the synchronization reference signal transmitted by the at least one neighboring network device. In an embodiment, the network device may indicate the at least one second receiving resource pool through the dedicated RRC signaling; or the network device may also indicate through the SIB, for example, when the number of the at least one second receiving resource pool is relatively small, the network device may also indicate through the SIB; or, when the number of the at least one second receiving resource pool is relatively large, the network device indicates the at least one second receiving resource pool jointly through the SIB and the dedicated RRC signaling, but second receiving resource pools indicated by the SIB and the dedicated RRC signaling correspond to different synchronous reference sources.

As an embodiment, considering a size limitation of the SIB, the number of receiving resource pools indicated through the SIB is limited, so the network device may determine, in the multiple receiving resource pools according to the number of the multiple receiving resource pools allocated to the terminal device, the at least one receiving resource pool indicated through the SIB. Specifically, when the number of the multiple receiving resource pools is less than or equal to a preset value, the network device indicates all the multiple receiving resource pools through the SIB, that is, the number of the at least one receiving resource pool indicated through the SIB is equal to the number of the multiple receiving resource pools. When the number of the multiple receiving resource pools is greater than the preset value, the network device may indicate the multiple receiving resource pools jointly through the SIB and the dedicated RRC, that is, the at least one receiving resource pool indicated through the SIB is a part of the multiple receiving resource pools, the number of the at least one receiving resource pool is smaller than the number of the multiple receiving resource pools, and for a further receiving resource pool other than the at least one receiving resource pool indicated through the SIB in the multiple receiving resource pools, it may be indicated through the dedicated RRC signaling.

It should be understood that, when the number of the multiple receiving resource pools is greater than a preset value, if the multiple receiving resource pools include a first receiving resource pool and/or a GNSS receiving resource pool, and the multiple receiving resources further include at least one second receiving resource pool, the SIB preferentially indicates the first receiving resource pool and/or the GNSS receiving resource pool, and if it is allowed in size, the SIB further indicates a part of the at least one second receiving resource pool and indicating a further second receiving resource pool by dedicated RRC signaling.

It should be understood that when the network device indicates multiple receiving resource pools through the SIB and the dedicated RRC signaling jointly, the synchronization reference corresponding to the receiving resource pool indicated through the SIB is different from the synchronous reference source corresponding to the receiving resource pool indicated through the dedicated RRC signaling. That is, there isn't a case that a receiving resource pool in the receiving resource pools indicated through the SIB and a receiving resource pool indicated through the dedicated RRC signaling correspond to the same synchronization reference.

It should be understood that the preset value may be set according to an actual application, for example, may be determined according to the size of the SIB, but the embodiment of the present application is not limited thereto.

Therefore, according to the method for resource allocation in the embodiment of the present application, a network device configures multiple receiving resource pools for a terminal device, and determines, according to synchronization references corresponding to the multiple receiving resource pools, a receiving resource pool indicated through an SIB, to avoid a case that a terminal device being in an idle state cannot be indicated through dedicated RRC signaling; in addition, the multiple receiving resource pools allocated to the terminal device can be jointly indicated through the SIB and the dedicated RRC signaling, thereby avoiding the size limitation of the SIB, thereby achieving flexible configuration of the receiving resource pools.

In the foregoing description, with reference to FIG. 1, a method for resource allocation according to an embodiment of the present application is described in detail from the perspective of a network device, and in the following, a method for resource allocation according to an embodiment of the present application will be described from the perspective of a terminal device in conjunction with FIG. 2.

FIG. 2 shows a schematic flowchart of a method 200 for resource allocation according to an embodiment of the present application, the method 200 may be performed by a terminal device. As shown in FIG. 2, the method 200 includes: S210, a terminal device receives an SIB transmitted by a network device; S220, the terminal device determines, according to the SIB, at least one receiving resource pool in multiple receiving resource pools allocated by the network device, where the multiple receiving resource pools are used by the terminal device to receive data transmitted by a further terminal device.

In an embodiment, the at least one receiving resource pool includes a first receiving resource pool corresponding to a first synchronization reference, and the first synchronization reference is determined by the terminal device according to a synchronization reference signal transmitted by the network device.

In an embodiment, the at least one receiving resource pool includes a global navigation satellite system (GNSS) synchronization reference, and the GNSS synchronization reference is determined by the terminal device according to a GNSS signal transmitted by a GNSS.

In an embodiment, the at least one receiving resource pool includes at least one second synchronization reference, and the at least one second synchronization reference is determined by the terminal device according to a synchronization reference signal transmitted by at least one neighboring network device of the network device.

In an embodiment, the method 200 further includes: receiving, by the terminal device, dedicated RRC signaling transmitted by the network device, where the dedicated RRC signaling is used to indicate a further receiving resource pool in the multiple receiving resource pools, and a synchronization reference corresponding to the further receiving resource pool is different from a synchronization reference corresponding to the at least one receiving resource pool.

In an embodiment, the further receiving resource pool includes at least one second synchronization reference, and the at least one second synchronization reference is determined by the terminal device according to a synchronization reference signal transmitted by at least one neighboring network device of the network device.

In an embodiment, the terminal device is in an idle state, and before the receiving, by the terminal device, dedicated radio resource control (RRC) signaling transmitted by the network device, the method 200 further includes: when the terminal device determines that the at least one receiving resource pool does not include a target receiving resource pool, switching from the idle state to a connected state.

In an embodiment, the target receiving resource pool corresponds to a target synchronization reference, and the target synchronization reference is determined by the terminal device according to a detectable synchronization reference signal.

It should be understood that, for the terminal device in the idle state, the terminal device receives the SIB transmitted by the network device, and determines at least one receiving resource pool indicated by the SIB, where the at least one receiving resource pool corresponds to at least one synchronization reference, and at the same time, the terminal device may receive multiple reference signals, and multiple synchronization references can be determined based on the multiple reference signals. If there exists the target synchronization reference in the multiple synchronization references corresponding to the multiple reference signals that can be received by the terminal device, the target synchronization reference does not belong to the at least one synchronization reference corresponding to the at least one receiving resource pool determined according to the SIB, then the terminal device switches the state, from the idle state to the connected state, and receives the dedicated RRC signaling transmitted by the network device, and determines the receiving resource pool indicated by the RRC signaling.

It should be understood that the network device in the method 200 may correspond to the network device in the method 100, and the terminal device in the method 200 may correspond to the terminal device in the method 100, and details are not described herein again.

Therefore, in the method for resource allocation according to the embodiment of the present application, the terminal device receives the SIB transmitted by the network device, and determines at least one receiving resource pool according to the SIB, and may allocate the receiving resource pool to the terminal device in an idle state. Besides, the receiving resource pool may also be determined according to dedicated RRC signaling, for example, when a synchronization reference determined by the terminal device in the idle state according to a synchronization reference signal does not belong to the synchronization reference corresponding to the at least one receiving resource pool indicated by the SIB, the terminal device can switch from the idle state to a connected state, receive the dedicated RRC signaling, and determine the receiving resource pool indicated by the dedicated RRC signaling, thereby avoiding that the terminal device being in the idle state cannot be indicated only through the dedicated RRC signaling, and also avoiding limitation on a size of the SIB, thus achieving flexible configuration of the receiving resource pools.

A method for resource allocation according to an embodiment of the present application is described above in detail with reference to FIG. 1 and FIG. 2, and a network device and a terminal device according to an embodiment of the present application will be described below with reference to FIG. 3 to FIG. 6.

As shown in FIG. 3, a network device 300 according to an embodiment of the present application includes: an allocating unit 310, a determining unit 320, and a transmitting unit 330.

Specifically, the allocating unit 310 is configured to: allocate multiple receiving resource pools for a terminal device, where the multiple receiving resource pools correspond to different synchronization references, and the multiple receiving resource pools are used by the terminal device to receive data transmitted by a further terminal device. The determining unit 320 is configured to: determine at least one receiving resource pool in the multiple receiving resource pools. The transmitting unit 330 is configured to: transmit an SIB to the terminal device, where the SIB is used to indicate the at least one receiving resource pool.

In an embodiment, there is no receiving resource pool in the multiple receiving resource pools corresponding to a same synchronization reference, and the transmitting unit 330 is specifically configured to: transmit dedicated RRC signaling to the terminal device, where the dedicated RRC signaling is used to indicate a further receiving resource pool in the multiple receiving resource pools except the at least one receiving resource pool.

In an embodiment, the different synchronization references include a first synchronization reference, and the first synchronization reference corresponds to a synchronization reference signal transmitted by the network device.

In an embodiment, the determining unit 320 is configured to: determine that the at least one receiving resource pool includes a first receiving resource pool corresponding to the first synchronization reference.

In an embodiment, the different synchronization references include a global navigation satellite system (GNSS) synchronization reference, and the GNSS synchronization reference corresponds to a GNSS signal transmitted by a GNSS.

In an embodiment, the determining unit 320 is specifically configured to: determine that the at least one receiving resource pool includes a GNSS receiving resource pool corresponding to the GNSS synchronization reference.

In an embodiment, the different synchronization references include at least one second synchronization reference, and the at least one second synchronization reference corresponds to a synchronization reference signal transmitted by at least one neighboring network device of the network device.

In an embodiment, the transmitting unit 330 is configured to: transmit dedicated RRC signaling to the terminal device, where the dedicated RRC signaling is used to indicate at least one second receiving resource pool corresponding to the at least one second synchronization reference.

In an embodiment, the determining unit 320 is specifically configured to: determine the at least one receiving resource pool according to a number of the multiple receiving resource pools.

In an embodiment, the determining unit 320 is configured to: if the number of the multiple receiving resource pools is smaller than or equal to a preset value, determine that the at least one receiving resource pool refers to all the multiple receiving resource pools; or, if the number of the multiple receiving resource pools is greater than or equal to the preset value, determine that the at least one receiving resource pool refers to a part of receiving resource pools in the multiple receiving resource pools.

It should be understood that the network device 300 according to the embodiment of the present application may correspondingly perform the method 100 in the embodiment of the present application, and the foregoing and other operations and/or functions of the units in the network device 300 are respectively for implementing corresponding processes of the network device in the methods in FIG. 1 and FIG. 2, and are not described here for brevity.

Therefore, in the embodiment of the present application, the network device configures multiple receiving resource pools for the terminal device, and determines, according to the synchronization references corresponding to the multiple receiving resource pools, the receiving resource pool indicated by the SIB, thereby avoiding that the terminal device being in an idle state cannot be indicated by the dedicated RRC signaling; in addition, the multiple receiving resource pools allocated to the terminal device can be jointly indicated by the SIB and the dedicated RRC signaling, thereby avoiding limitation on a size of the SIB, thus achieving flexible configuration of the receiving resource pools.

Figure 4:
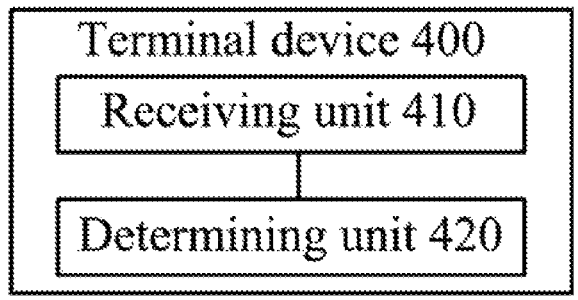
FIG. 4 is a schematic block diagram of a terminal device according to an embodiment of the present application.

As shown in FIG. 4, the terminal device 400 according to an embodiment of the present application includes: a receiving unit 410 and a determining unit 420.

Specifically, the receiving unit 410 is configured to: receive an SIB transmitted by a network device; the determining unit 420 is configured to: determine, according to the SIB, at least one receiving resource pool in multiple receiving resource pools allocated by the network device, where the multiple receiving resource pools are used by the terminal device to receive data transmitted by a further terminal device.

In an embodiment, the at least one receiving resource pool includes a first receiving resource pool corresponding to a first synchronization reference, and the first synchronization reference is determined by the terminal device according to a synchronization reference signal transmitted by the network device.

In an embodiment, the at least one receiving resource pool includes a global navigation satellite system (GNSS) synchronization reference, and the GNSS synchronization reference is determined by the terminal device according to a GNSS signal transmitted by a GNSS.

In an embodiment, the at least one receiving resource pool includes at least one second synchronization reference, and the at least one second synchronization reference is determined by the terminal device according to a synchronization reference signal transmitted by at least one neighboring network device of the network device.

In an embodiment, the receiving unit 410 is further configured to: receive dedicated RRC signaling transmitted by the network device, where the dedicated RRC signaling is used to indicate a further receiving resource pool in the multiple receiving resource pools, and a synchronization reference corresponding to the further receiving resource pool is different from a synchronization reference corresponding to the at least one receiving resource pool.

In an embodiment, the further receiving resource pool includes at least one second synchronization reference, and the at least one second synchronization reference is determined by the terminal device according to a synchronization reference signal transmitted by at least one neighboring network device of the network device.

In an embodiment, the terminal device is in an idle state, and the determining unit 420 is further configured to: before the receiving unit 410 receives the dedicated RRC signaling transmitted by the network device, when determining that the at least one receiving resource pool does not include a target receiving resource pool, switch from the idle state to a connected state.

In an embodiment, the target receiving resource pool corresponds to a target synchronization reference, and the target synchronization reference is determined by the terminal device according to a detectable synchronization reference signal.

It should be understood that the terminal device 400 according to the embodiment of the present application may correspondingly perform the method 200 in the embodiment of the present application, and the foregoing and other operations and/or functions of the units in the terminal device 400 are respectively for implementing the corresponding processes of the terminal devices in the methods in FIG. 1 and FIG. 2, and are not described herein for brevity.

Therefore, in the method for resource allocation according to the embodiment of the present application, the terminal device receives the SIB transmitted by the network device, and determines at least one receiving resource pool according to the SIB, and may allocate the receiving resource pool to the terminal device in an idle state. Besides, the receiving resource pool may also be determined according to dedicated RRC signaling, for example, when a synchronization reference determined by the terminal device in the idle state according to a synchronization reference signal does not belong to the synchronization reference corresponding to the at least one receiving resource pool indicated by the SIB, the terminal device can switch from the idle state to a connected state, receive the dedicated RRC signaling, and determine the receiving resource pool indicated by the dedicated RRC signaling, thereby avoiding that the terminal device being in the idle state cannot be indicated only through the dedicated RRC signaling, and also avoiding limitation on a size of the SIB, thus achieving flexible configuration of the receiving resource pools.

Figure 5:
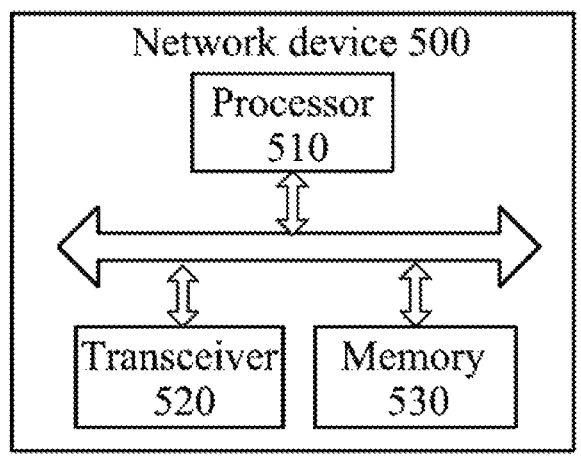
FIG. 5 is another schematic block diagram of a network device according to an embodiment of the present application.

FIG. 5 shows a schematic block diagram of a network device 500 according to an embodiment of the present application. As shown in FIG. 5, the network device 500 includes a processor 510 and a transceiver 520. The processor 510 is connected to the transceiver 520, and in an embodiment, the network device 500 further includes a memory 530 that is connected to the processor 510. The processor 510, the memory 530, and the transceiver 520 communicate, transfer and/or control data signals with each other through internal connection paths. The memory 530 can be configured to store an instruction, and the processor 510 is configured to execute the instruction stored in the memory 530 to control the transceiver 520 to transmit information or a signal, the processor 510 is configured to: allocate multiple receiving resource pools for a terminal device, where the multiple receiving resource pools correspond to different synchronization references, the multiple receiving resource pools are used by the terminal device to receive data transmitted by a further terminal device, and determine at least one receiving resource pool in the multiple receiving resource pools; the transceiver 520 is configured to: transmit an SIB to the terminal device, where the SIB is used to indicate the at least one receiving resource pool.

It should be understood that the network device 500 according to the embodiment of the present application may correspond to the network device 300 in the embodiment of the present application, and may correspond to the corresponding subject matter for performing the method 100 according to the embodiment of the present application, and the above and other operations and/or functions of the units in the network device 500 are respectively for implementing the corresponding processes of the network devices in the methods in FIG. 1 and FIG. 2, and are not described herein again for brevity.

Therefore, in the embodiment of the present application, the network device configures multiple receiving resource pools for the terminal device, and determines, according to the synchronization references corresponding to the multiple receiving resource pools, the receiving resource pool indicated by the SIB, thereby avoiding that the terminal device being in an idle state cannot be indicated by the dedicated RRC signaling; in addition, the multiple receiving resource pools allocated to the terminal device can be jointly indicated by the SIB and the dedicated RRC signaling, thereby avoiding limitation on a size of the SIB, thus achieving flexible configuration of the receiving resource pools.

Figure 6:
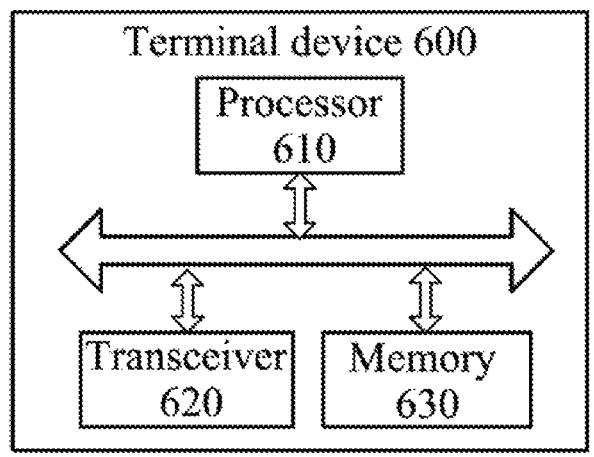
FIG. 6 is another schematic block diagram of a terminal device according to an embodiment of the present application.

FIG. 6 shows a schematic block diagram of a terminal device 600 according to an embodiment of the present application. As shown in FIG. 6, the terminal device 600 includes a processor 610 and a transceiver 620. The processor 610 is connected to the transceiver 620, and in an embodiment, the terminal device 600 further includes a memory 630, and the memory 630 is connected to the processor 610. The processor 610, the memory 630 and the transceiver 620 communicate, transfer and/or control data signals with each other through internal connection paths. The memory 630 can be configured to store an instruction, and the processor 610 is configured to execute the instruction stored in the memory 630 to control the transceiver 620 to transmit information or a signal, the transceiver 620 is configured to: receive an SIB transmitted by the network device; the processor 610 is configured to: determine, according to the SIB, at least one receiving resource pool in multiple receiving resource pools allocated by the network device, where the multiple receiving resource pools are used by the terminal device to receive data transmitted by a further terminal device.

It should be understood that the terminal device 600 according to the embodiment of the present application may correspond to the network device 400 in the embodiment of the present application, and may correspond to the corresponding subject matter in the method 200 according to the embodiment of the present application, and the above and other operations and/or functions of the units in the network device 600 are respectively for implementing the corresponding processes of the network devices in the methods in FIG. 1 and FIG. 2, and are not described herein again for brevity.

Therefore, in the embodiment of the present application, the terminal device receives the SIB transmitted by the network device, and determines at least one receiving resource pool according to the SIB, and may allocate the receiving resource pool to the terminal device in an idle state. Besides, the receiving resource pool may also be determined according to dedicated RRC signaling, for example, when a synchronization reference determined by the terminal device in the idle state according to a synchronization reference signal does not belong to the synchronization reference corresponding to the at least one receiving resource pool indicated by the SIB, the terminal device can switch from the idle state to a connected state, receive the dedicated RRC signaling, and determine the receiving resource pool indicated by the dedicated RRC signaling, thereby avoiding that the terminal device being in the idle state cannot be indicated only through the dedicated RRC signaling, and also avoiding limitation on a size of the SIB, thus achieving flexible configuration of the receiving resource pools.

Figure 7:
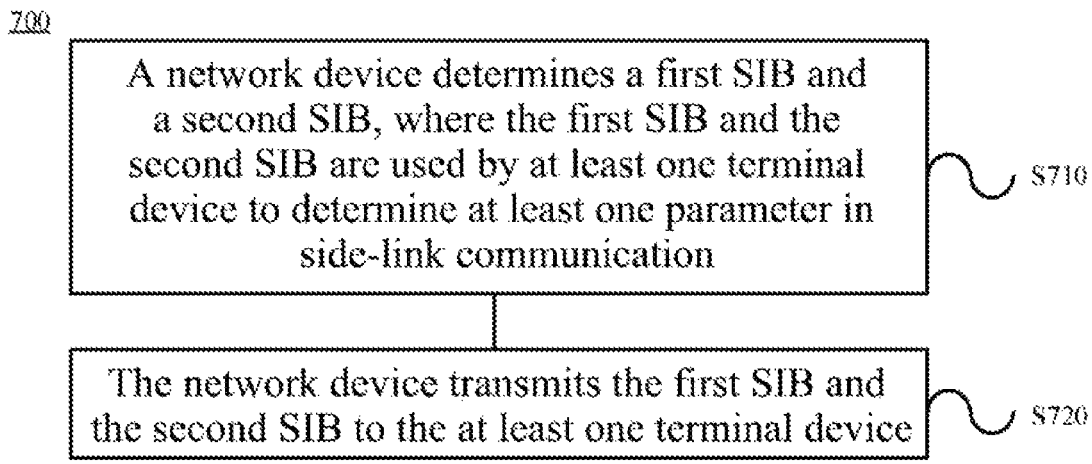
FIG. 7 is a schematic flowchart of a method for parameter configuration according to an embodiment of the present application.

FIG. 7 shows a schematic flowchart of a method 700 for parameter configuration according to an embodiment of the present application, the method 700 may be performed by a network device. As shown in FIG. 7, the method 700 includes: S710, a network device determines a first SIB and a second SIB, where the first SIB and the second SIB are used by at least one terminal device to determine at least one parameter in side-link communication; S720, the network device transmits the first SIB and the second SIB to the at least one terminal device.

It should be understood that the at least one parameter may be used for side-link communication between any terminal device and a further terminal device in the at least one terminal device. In an embodiment, the at least one parameter includes at least one of the following parameters: a side-link working frequency, a receiving resource pool parameter, a transmitting resource pool parameter, a synchronization reference signal, a synchronization resource parameter, a resource selecting parameter, or a layer one configuration parameter.

In an embodiment, the receiving resource pool parameter may be used to indicate a receiving resource allocated by the network device to the terminal device, where the receiving resource includes a time domain resource and/or a frequency domain resource, for example, including a size and a location of the time-frequency resource; similarly, the transmitting resource pool parameter may be used to indicate a transmitting resource allocated by the network device to the terminal device, where the transmitting resource includes a time domain resource and/or a frequency domain resource, for example, including a size and a location of the time-frequency resource, and the receiving resource and the transmitting resource are used for side-link communication between the terminal device and a further terminal device.

In an embodiment, the resource selecting parameter may be multiple resources or multiple resource pools allocated by the network device to the terminal device, so that the terminal device selects a resource in the multiple resources or multiple resource pools for side-link communication with the further terminal device.

In an embodiment, the layer one configuration parameter may include: at least one of a transmission power, the number of resources, the number of retransmissions for a hybrid automatic repeat request (HARQ), and a modulation and demodulation mode that are allocated by the network device to the terminal device.

It should be understood that at least one terminal device in the embodiment of the present application may include one or more terminal devices, and the at least one terminal device may include a first terminal device and/or a second terminal device. Specifically, the first terminal device only supports performing the side-link communication in a first format, the second terminal device supports performing the side-link communication in a second format, or the second terminal device may support performing the side-link communication in both a first format and a second format, the first format is different from the second format.

Specifically, the first format and the second format may be different working releases or modes of the terminal device. For example, the first terminal device only supporting the first format may indicate that the first terminal device supports release 14 (R14), the first terminal device may work in the R14 mode, and similarly, the second terminal device supporting the second format may indicate that the second terminal device supports R15. In addition, when the working release of the first terminal device is lower than the working release of the second terminal device, correspondingly, for the second terminal device working in the higher release, the second terminal device may only support R15, and is incompatible with R14. Alternatively, the second terminal device can support both R14 and R15, that is, the second terminal device is compatible with both the higher and the lower working releases.

When the at least one terminal device includes the first terminal device and the second terminal device, a relationship with the first SIB and the second SIB will be described in detail below with reference to several specific embodiments.

As an embodiment, the network device transmits a first SIB and a second SIB to the first terminal device and the second terminal device, where the terminal devices receive the first SIB and the second SIB, and the first terminal device determines a first parameter of the at least one parameter according to the first SIB, and the second terminal device determines the first parameter according to the second SIB, where the first parameter may be any one of the at least one parameter of the side-link communication.

Specifically, if the first terminal device supports only the first format, the first SIB includes a first parameter corresponding to the first format of the first terminal device; if the second terminal device only supports the second format, the second SIB includes a first parameter corresponding to the second format of the second terminal device; if the second terminal device supports the first format and the second format, the second SIB includes a first parameter corresponding to the first format and a first parameter corresponding to the second format of the second terminal device. For the first parameter corresponding to the first format of the first terminal device included in the first SIB, and the first parameter corresponding to the first format and the first parameter corresponding to the second format of the second terminal device included in the second SIB, the three may be the same or different, and the embodiment of the present application is not limited thereto.

Correspondingly, the first terminal device receives the first SIB, determines the first parameter according to the first SIB, and performs identifier mapping according to the first parameter, so that the first terminal device performs, according to the mapped identifier of the first parameter, communication with the network device, or performs side-link communication with a further terminal device. For example, the first terminal device and the network device may map the first parameter to the first identifier based on the same mapping rule, and the first terminal device communicates with the network device by using the first identifier.

Similarly, the second terminal device receives the second SIB, determines a first parameter corresponding to the first format and/or the second format according to the second SIB, and performs identifier mapping according to the first parameter, the second terminal device performs, according to the mapped identifier of the second parameter, communication with the network device or performs side-link communication with a further terminal device. For example, the second terminal device and the network device may map the second parameter to the second identifier based on the same mapping rule, and the second terminal device communicates with the network device by using the second identifier.

For example, description is made by taking an example where the first parameter may be a side-link working frequency of the terminal device, and assuming that the first terminal device supports only the first format and the second terminal device supports the first format and the second format, the first SIB determined by the network device includes a side-link working frequency corresponding to the first format of the first terminal device, the second SIB includes a side-link working frequency corresponding to the first format of the second terminal device and a side-link working frequency corresponding to the second format, the network device transmits the first SIB and the second SIB to the two terminal devices, so that the first terminal device determines the side-link working frequency corresponding to the first format according to the first SIB and performs identifier mapping according to the side-link working frequency; the second terminal device determines a side-link working frequency corresponding to the first format and a side-link working frequency corresponding to the second format according to the second SIB, and performs identifier mapping according to the side-link working frequencies corresponding to the first format and the second format.

As an embodiment, the network device transmits the first SIB and the second SIB to the first terminal device and the second terminal device. Correspondingly, the terminal device receives the first SIB and the second SIB, where the first terminal device may determines a second parameter of the at least one parameter according to the first SIB; the second terminal device may determine the second parameter according to the first SIB and the second SIB, where an index of the second parameter included in the first SIB received by the second terminal device is different from an index of the second parameter included in the second SIB, and the second parameter is any one of the at least one parameter, and the second parameter is different from the first parameter.

Specifically, if the first terminal device supports only the first format, the first SIB includes a second parameter corresponding to the first format of the first terminal device; if the second terminal device only supports the second format, the first SIB includes a second parameter corresponding to the second format of the second terminal device, meanwhile the second SIB includes a second parameter corresponding to the second format of the second terminal device; if the second terminal device supports the first format and the second format, the first SIB includes a second parameter corresponding to the first format of the second terminal device and/or a second parameter corresponding to the second format, the second SIB includes a second parameter corresponding to the second format of the second terminal device, or may include a second parameter corresponding to the first format of the second terminal device. For the second parameter corresponding to the first format of the first terminal device included in the first SIB, the second parameter corresponding to the first format and/or the second parameter corresponding to the second format of the second terminal device included in the first SIB, and the second parameter corresponding to the first format and the second parameter corresponding to the second format of the second terminal device included in the second SIB, they may be the same or different, and the embodiment of the present application is not limited thereto.

Correspondingly, the first terminal device receives the first SIB, determines the second parameter according to the first SIB, and performs identifier mapping only according to the second parameter, so that the first terminal device performs identifier mapping only according to the second parameter, performs communication with a network device or performs side-link communication with a further terminal device. For example, the first terminal device and the network device may map the second parameter to the first identifier based on the same mapping rule, and the first terminal device communicates with the network device by using the first identifier.

The second terminal device receives the first SIB and the second SIB, determines, according to the first SIB and the second SIB, a second parameter corresponding to the first format and/or the second format, and performs identifier mapping according to the second parameters determined through the first SIB and the second SIB. The second terminal device may map the second parameters determined through the first SIB and the second SIB to the same or different identifiers, for example, if the second parameters determined through the first SIB and the second SIB are for a same carrier, the second parameter determined through the first SIB and the second parameter determined through the second SIB may be mapped to the same identifier; if the second parameters determined through the first SIB and the second SIB are for different carriers, the second parameter determined through the first SIB and the second parameter determined through the second SIB may be mapped to different identifiers, and the embodiment of the present application is not limited thereto. For example, the second terminal device maps the second parameter determined through the first SIB to the first identifier and the second parameter determined through the second SIB to the second identifier according to the second parameter determined through the first SIB and the second parameter determined through the second SIB for different carriers, so that the second terminal device uses the first identifier and/or the second identifier to perform communication with the network device or perform side-link communication with a further terminal device. For example, the second terminal device and the network device perform mapping based on the same mapping rule to map the second parameter determined through the first SIB to the first identifier and the second parameter determined through the second SIB to the second identifier, so that the second terminal device communicates with the network device by using the first identifier and/or the second identifier.

For example, description is made by taking an example where the second parameter may be the receiving resource pool parameter of the terminal device, and assuming that the first terminal device supports the first format and the second terminal device supports the first format and the second format, the first SIB determined by the network device includes a receiving resource pool parameter corresponding to the first format of the first terminal device, meanwhile the first SIB further includes a receiving resource pool parameter corresponding to a first format and/or the second format of the second terminal device, the second SIB determined by the network device includes a receiving resource pool parameter corresponding to the second format of the second terminal device, or the second SIB includes receiving resource pool parameters corresponding to the first format and the second format of the second terminal device. The network device transmits the first SIB and the second SIB to the two terminal devices, so that the first terminal device determines a receiving resource pool parameter corresponding to the first format according to the first SIB, and performs identifier mapping according to the receiving resource pool parameter, the second terminal device determines, according to the first SIB and the second SIB, a receiving resource pool parameter corresponding to the first format and a receiving resource pool parameter corresponding to the second format, and performs identifier mapping respectively according to the receiving resource pool parameters determined through the first SIB and the second SIB, and a mapped identifier of the receiving resource pool parameter determined through the first SIB and a mapped identifier of the receiving resource pool parameter determined through the second SIB can be the same or different.

As an embodiment, the network device may further transmit a first SIB to a first terminal device and a second terminal device, where the terminal devices receive the first SIB, and the first terminal device determines a third parameter in the at least one parameter according to the first SIB, the second terminal device determines the third parameter according to the first SIB, where the third parameter may be any one of at least one parameter of a side-link communication, the third parameter is different from the first parameter and the second parameter.

Specifically, if the first terminal device supports only the first format, the first SIB includes a third parameter corresponding to the first format of the first terminal device; if the second terminal device only supports the second format, the first SIB further includes the third parameter corresponding to the second format of the second terminal device; if the second terminal device supports the first format and the second format, the first SIB includes a third parameter corresponding to the first format and a third parameter corresponding to the second format of the second terminal device. For the third parameter corresponding to the first format of the first terminal device included in the first SIB, the third parameter corresponding to the first format and the third parameter corresponding to the second format of the second terminal device included in the first SIB, the three may be the same or different, and the embodiment of the present application is not limited thereto.

Correspondingly, the first terminal device receives the first SIB, determines the third parameter according to the first SIB, and performs identifier mapping only according to the third parameter, so that the first terminal device performs communication with the network device or performs side-link communication with a further terminal device according to the mapped identifier of the third parameter. For example, the first terminal device and the network device may map the third parameter to the first identifier based on the same mapping rule, and the first terminal device communicates with the network device by using the first identifier.

Similarly, the second terminal device receives the first SIB, and determines a third parameter corresponding to the first format and/or the second format according to the first SIB, and performs identifier mapping according to the third parameters determined through the first SIB, so that the second terminal device performs communication with the network device or performs side-link communication with a further terminal device according to the mapped identifier of the third parameters. For example, the second terminal device and the network device may map the third parameters to the second identifier based on the same mapping rule, and the second terminal device communicates with the network device by using the second identifier.

For example, description is made by taking an example where the first parameter may be a transmitting resource pool parameter of the terminal device, and assuming that the first terminal device supports only the first format, and the second terminal device supports the first format and the second format, then the first SIB determined by the network device includes a transmitting resource pool parameter corresponding to the first format of the first terminal device, and further includes a transmitting resource pool parameter corresponding to the first format and a transmitting resource pool parameter corresponding to the second format of the second terminal device, the network device transmits the first SIB to the two terminal devices, so that the first terminal device determines the transmitting resource pool parameter corresponding to the first format according to the first SIB, and performs identifier mapping according to the resource pool parameter; the second terminal device determines a transmitting resource pool parameter corresponding to the first format and a transmitting resource pool parameter corresponding to the second format according to the first SIB, and performs identifier mapping according to the resource pool parameters determined through the first SIB.

Therefore, according to the method for parameter configuration in the embodiment of the present application, a network device transmits a first SIB and a second SIB to at least one terminal device, where the at least one terminal device may include a terminal device that supports different formats for side-link communication, so that different terminal devices may determine at least one parameter according to the received first SIB and/or second SIB, and perform side-link communication according to the at least one parameter, so that the network device broadcasts, through the SIB, different values of at least one parameter in different formats, and that the terminal device supporting different formats obtains a corresponding parameter, thereby implementing flexible configuration of the parameter.

In the foregoing description, with reference to FIG. 7, a method for parameter configuration according to an embodiment of the present application is described in detail from the perspective of a network device. In the following, a method for parameter configuration according to an embodiment of the present application may be described from the perspective of a terminal device with reference to FIG. 8.

Figure 8:
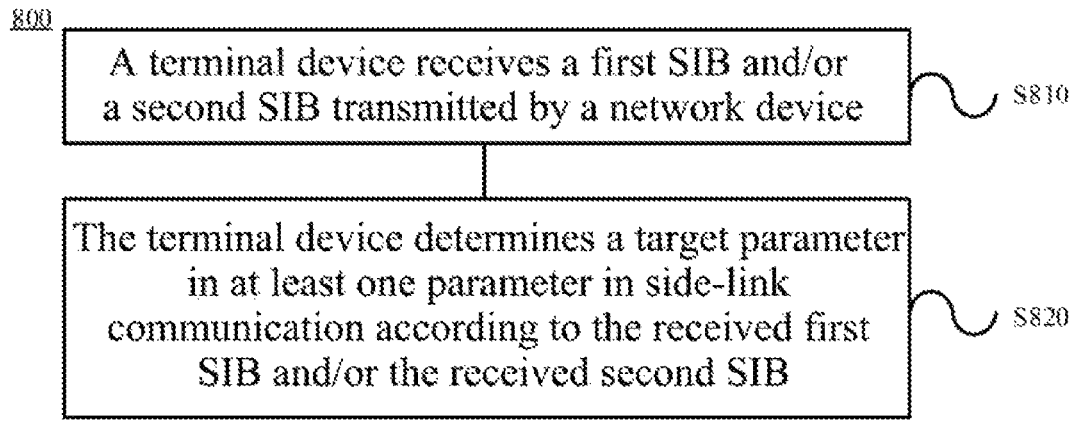
FIG. 8 is another schematic flowchart of a method for parameter configuration according to an embodiment of the present application.

FIG. 8 shows a schematic flowchart of a method 800 for parameter configuration according to an embodiment of the present application, the method 800 may be performed by a terminal device. As shown in FIG. 8, the method 800 includes: S810, a terminal device receives a first system information block (SIB) and/or a second SIB transmitted by a network device; S820, the terminal device determines a target parameter in at least one parameter in side-link communication according to the received first SIB and/or the received second SIB.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

As an embodiment, the terminal device only supports performing the side-link communication in a first format.

As an embodiment, the terminal device supports performing the side-link communication in the first format and a second format.

In an embodiment, where the determining, by the terminal device, at least one parameter in side-link communication according to the received first SIB and/or the received second SIB includes: determining, by the terminal device, a first parameter in the at least one parameter according to the received first SIB.

In an embodiment, after the determining, by the terminal device, a first parameter in the at least one parameter according to the received first SIB, the method further includes: performing, by the terminal device, identifier mapping only according to the first parameter determined through the first SIB.

In an embodiment, where the determining, by the terminal device, at least one parameter in side-link communication according to the received first SIB and/or the received second SIB includes: determining, by the terminal device, a second parameter in the at least one parameter according to the received second SIB.

In an embodiment, after the determining, by the terminal device, a second parameter in the at least one parameter according to the received second SIB, the method further includes: performing, by the terminal device, identifier mapping only according to the second parameter determined through the second SIB.

In an embodiment, where the determining, by the terminal device, at least one parameter in side-link communication according to the received first SIB and/or the received second SIB includes: determining, by the terminal device, third parameters in the at least one parameter according to the received first SIB and the received second SIB.

In an embodiment, the second parameters determined through the first SIB and the second SIB are used by the second terminal device to perform identifier mapping.

In an embodiment, if the second parameters determined through the first SIB and the second SIB are for a same carrier, the second parameters determined through the first SIB and the second SIB are used by the second terminal device to map to a same identifier.

In an embodiment, the second parameters determined through the first SIB and the second SIB are used by the second terminal device to map to different identifiers.

In an embodiment, if the second parameters determined through the first SIB and the second SIB are for different carriers, the second parameters determined through the first SIB and the second SIB are used by the second terminal device to map to different identifiers.

In an embodiment, the terminal device supports performing the side-link communication in the first format and the second format, where the determining, by the terminal device, at least one parameter in side-link communication according to the received first SIB and/or the received second SIB includes: determining, by the terminal device, the third parameter corresponding to the first format and/or the second format according to the first SIB.

In an embodiment, the terminal device supports performing the side-link communication in the first format and the second format, where the determining, by the terminal device, at least one parameter in side-link communication according to the received first SIB and/or the received second SIB, includes: determining, by the terminal device, the second parameter corresponding to the second format according to the second SIB; or determining, by the terminal device, the third parameters corresponding to the first format and the second format according to the second SIB.

It should be understood that the terminal device in the method 800 may be the first terminal device in the method 700, or may be the second terminal device in the method 700, correspondingly, the first parameter, the second parameter and the third parameter in the method 800 may correspond to the second parameter in the method 700. For example, the terminal device in the method 800 is the second terminal device in the method 700, correspondingly, the third parameter in the method 800 may correspond to the second parameter in the method 700, and are not described herein again for brevity.

Therefore, in the method for parameter configuration according to the embodiment of the present application, the network device transmits a first SIB and a second SIB to at least one terminal device, and for any of the at least one terminal device, the terminal device receives the first SIB and/or the second SIB, the terminal device may support performing side-link communication in one or more formats, and the terminal device may determine the corresponding at least one parameter according to the received first SIB and/or the received second SIB, and perform side-link communication according to the at least one parameter, so that the network device broadcasts different values of a parameter in different formats through the SIB, and enables the terminal device supporting different formats to obtain corresponding parameters, thereby implementing flexible parameter configuration.

An embodiment in which a network device broadcasts an SIB is described above with reference to FIGS. 7 and 8, and an embodiment in which a network device transmits dedicated signaling to a terminal device is described below with reference to FIGS. 9 and 10.

FIG. 9 illustrates a schematic flowchart of a method 900 for parameter configuration according to an embodiment of the present application, the method 900 may be performed by a network device. As shown in FIG. 9, the method 900 includes: S910, a network device determines parameter information of a terminal device, where the terminal device supports performing side-link communication in a first format and a second format, and the parameter information includes at least one parameter for the terminal device to perform the side-link communication in the first format and the second format; S920, the network device transmits the parameter information to the terminal device, where the parameter information is used by the terminal device to determine the at least one parameter.

It should be understood that the at least one parameter may be used for side-link communication between any terminal device and a further terminal device in the at least one terminal device. In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

In an embodiment, the receiving resource pool parameter may be used to indicate a receiving resource allocated by the network device to the terminal device, where the receiving resource includes a time domain resource and/or a frequency domain resource, for example, including a size and a location of the time-frequency resource; similarly, the transmitting resource pool parameter may be used to indicate a transmitting resource allocated by the network device to the terminal device, where the transmitting resource includes a time domain resource and/or a frequency domain resource, for example, including a size and a location of the time-frequency resource, and the receiving resource and the transmitting resource are used for side-link communication between the terminal device and a further terminal device.

In an embodiment, the resource selecting parameter may be multiple resources or multiple resource pools allocated by the network device to the terminal device, so that the terminal device selects a resource in the multiple resources or multiple resource pools for side-link communication with the further terminal device.

In an embodiment, the layer one configuration parameter may include: at least one of a transmission power, the number of resources, the number of retransmissions for a hybrid automatic repeat request (HARQ), and a modulation and demodulation mode that are allocated by the network device to the terminal device.

It should be understood that the terminal device may support the side-link communication in a first format or a second format, the first format is different from the second format. Specifically, the first format and the second format may be different working releases or modes of the terminal device. For example, the terminal device supports the first format and the second format, which may indicate that the terminal device supports release 14 (release 14, R14), the terminal device can work in the R14 mode, and the terminal device also supports R15 and can work in the R15 mode, that is, the terminal device is compatible with both the higher and lower working releases.

In the embodiment of the present application, the network device transmits the parameter information to the terminal device since the terminal device supports two formats, where the parameter information includes at least one parameter when the terminal device performs side-link communication in the first format, and further includes at least one parameter when performing the side-link communication in the second format.

Correspondingly, the terminal device receives the parameter information, and determines at least one parameter included in the parameter information. Specifically, when the terminal device selects to perform the side-link communication in the first format, the corresponding at least one parameter being adopted is a parameter corresponding to the first format, and when the terminal device selects to perform the side-link communication in the second format, the corresponding at least one parameter being adopted is a parameter corresponding to the second format.

For example, take the determining the side-link working frequency of the terminal device as an example, the working frequency in the first format may include two frequencies, the working frequency in the second format may include three frequencies, and the terminal device supports the first format and the second format at the same time, that is, the terminal device can support five working frequencies, so the network device can transmit the parameter information to the terminal device, where the parameter information includes two working frequencies corresponding to the first format and three working frequencies corresponding to the second format, so that the first terminal device determines, according to the parameter information, that its working frequency may include two working frequencies corresponding to the first format, and may also include three working frequencies corresponding to the second format, for example, when this terminal device works in the first format, the two working frequencies corresponding to the first format are selected, when the terminal device works in the second format, the three working frequencies corresponding to the second format are selected. The embodiment of the present application is not limited thereto.

Therefore, in the method for parameter configuration according to the embodiment of the present application, the network device transmits the parameter information to the terminal device, where the terminal device can support performing the side-link communication in the first format and the second format, and correspondingly, the parameter information includes the parameter corresponding to the first format and the parameter corresponding to the second format of the terminal device, so that the terminal device can determine the parameters corresponding to the two formats according to the parameter information, thus enabling the terminal device to select different formats to work and adopt corresponding parameters.

In the foregoing description, with reference to FIG. 9, the method for parameter configuration according to the embodiments of the present application is described in detail from the perspective of a network device. In the following, Referring to FIG. 10, a method for parameter configuration according to an embodiment of the present application will be described from the perspective of a terminal device.

FIG. 10 shows a schematic flowchart of a method 1000 for parameter configuration according to an embodiment of the present application, the method 1000 may be performed by a terminal device. As shown in FIG. 10, the method 1000 includes: S1010, a terminal device receives parameter information transmitted by a network device, where the terminal device supports performing side-link communication in a first format and a second format, and the parameter information includes at least one parameter for the terminal device to perform the side-link communication in the first format and the second format; S1020, the terminal device determines, according to the parameter information, the at least one parameter corresponding to the first format and the at least one parameter corresponding to the second format.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

In an embodiment, the method 1000 further includes: the terminal device selects the at least one parameter corresponding to the first format or the at least one parameter corresponding to the second format, and performs the side-link communication.

Therefore, in the method for parameter configuration according to the embodiment of the present application, a terminal device receives parameter information transmitted by a network device, and the terminal device can support performing side-link communication in the first format and the second format, and correspondingly, the parameter corresponding to the first format and the parameter value corresponding to the second format are included the parameter information, so that the terminal device can determine the parameters corresponding to the two formats according to the parameter information, thereby enabling the terminal device to select different formats to work and adopt corresponding parameters.

It should be understood that, in the various embodiments of the present application, the sizes of the sequence numbers of the foregoing processes do not mean the order for execution, and the order for execution of each process should be determined by its function and internal logic, and is not intended to limit the implementation process of the embodiment of the present application.

In addition, the term "and/or" herein is merely an association relationship describing an associated object, indicating that there may be three relationships, for example, A and/or B may indicate three cases of A existing separately, A and B existing at the same time, and B existing separately. In addition, the character "/" herein generally indicates that the contextual object is an "or" relationship.

A method for parameter configuration according to an embodiment of the present application is described above in detail with reference to FIG. 7 to FIG. 10, and a network device and a terminal device according to an embodiment of the present application will be described below with reference to FIG. 11 to FIG. 18.

Figure 11:
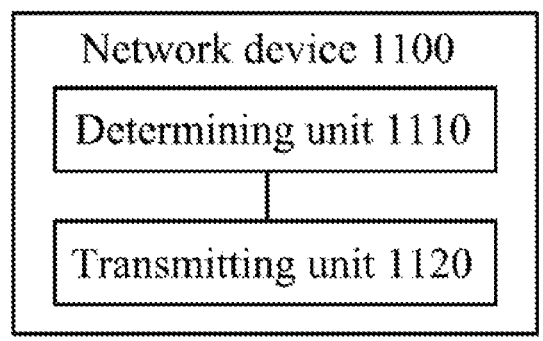
FIG. 11 is a schematic block diagram of a network device according to another embodiment of the present application.

As shown in FIG. 11, the network device 1100 according to an embodiment of the present application includes: a determining unit 1110, a transmitting unit 1120.

Specifically, the determining unit 1110 is configured to: determine a first system information block (SIB) and a second SIB, where the first SIB and the second SIB are used by at least one terminal device to determine at least one parameter in side-link communication; the transmitting unit 1120 is configured to: transmit the first SIB and the second SIB to the at least one terminal device.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

In an embodiment, the at least one terminal device includes a first terminal device and/or a second terminal device, where the first terminal device only supports performing the side-link communication in a first format, and the second terminal device supports performing the side-link communication in a second format.

In an embodiment, the second terminal device further supports performing the side-link communication in the first format.

In an embodiment, the first SIB is used by the first terminal device to determine a first parameter in the at least one parameter, and the second SIB is used by the second terminal device to determine the first parameter.

In an embodiment, the first parameter determined through the first SIB is used by the first terminal device to perform identifier mapping, and the first parameter determined through the second SIB is used by the second terminal device to perform identifier mapping.

In an embodiment, the first SIB is used by the first terminal device to determine a second parameter in the at least one parameter, and the first SIB and the second SIB are used by the second terminal device to determine the second parameters.

In an embodiment, the second parameters determined through the first SIB and the second SIB are used by the second terminal device to perform identifier mapping.

In an embodiment, if the second parameters determined through the first SIB and the second SIB are for a same carrier, the second parameters determined through the first SIB and the second SIB are used by the second terminal device to map to a same identifier.

In an embodiment, the second parameters determined through the first SIB and the second SIB are used by the second terminal device to map to different identifiers.

In an embodiment, if the second parameters determined through the first SIB and the second SIB are for different carriers, the second parameters determined through the first SIB and the second SIB are used by the second terminal device to map to different identifiers.

In an embodiment, the second terminal device supports performing the side-link communication in the first format and the second format, and the first SIB is used by the second terminal device to determine the second parameter corresponding to the first format and/or the second format.

In an embodiment, the second SIB is used by the second terminal device to determine the second parameter corresponding to the second format; or the second SIB is used by the second terminal device to determine the second parameters corresponding to the first format and the second format.

In an embodiment, the first SIB is used by the first terminal device and the second terminal device to determine a third parameter in the at least one parameter.

It should be understood that the network device 1100 according to the embodiment of the present application may correspondingly perform the method 700 in the embodiment of the present application, and the foregoing and other operations and/or functions of the units in the network device 1100 are respectively for implementing the corresponding processes of the network device of the methods in FIG. 7 and FIG. 8, and is not described here for brevity.

Therefore, in the embodiment of the present application, the network device transmits the first SIB and the second SIB to the at least one terminal device, where the at least one terminal device may include a terminal device that supports different formats for side-link communication, thus different terminal devices can determine at least one parameter according to the received first SIB and/or the received second SIB, and perform side-link communication according to the at least one parameter, so that the network device broadcasts different values of a parameter in different formats through the SIB, and enables the terminal device supporting different formats to obtain corresponding parameters, thereby implementing flexible parameter configuration.

Figure 12:
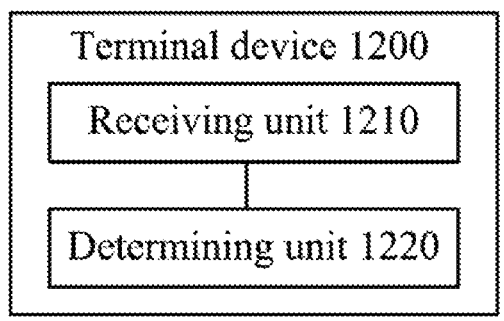
FIG. 12 is a schematic block diagram of a terminal device according to still another embodiment of the present application.

As shown in FIG. 12, the terminal device 1200 according to an embodiment of the present application includes: a receiving unit 1210 and a determining unit 1220.

Specifically, the receiving unit 1210 is configured to: receive a first SIB and/or a second SIB transmitted by a network device; the determining unit 1220 is configured to: determine at least one parameter in side-link communication according to the received first SIB and/or the received second SIB.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

In an embodiment, the terminal device only supports performing the side-link communication in a first format.

In an embodiment, the terminal device supports performing the side-link communication in the first format and a second format.

In an embodiment, the determining unit 1220 is specifically configured to: determine a first parameter in the at least one parameter according to the received first SIB.

In an embodiment, the determining unit 1220 is specifically configured to: after determining the first parameter in the at least one parameter according to the received first SIB, perform identifier mapping only according to the first parameter determined through the first SIB.

In an embodiment, the determining unit 1220 is specifically configured to: determine a second parameter in the at least one parameter according to the received second SIB.

In an embodiment, the determining unit 1220 is specifically configured to: after determining the second parameter in the at least one parameter according to the received second SIB, perform identifier mapping only according to the second parameter determined through the second SIB.

In an embodiment, the determining unit 1220 is specifically configured to: determine third parameters in the at least one parameter according to the received first SIB and the received second SIB.

In an embodiment, the determining unit 1220 is specifically configured to: after determining the third parameters in the at least one parameter according to the received first SIB and the received second SIB, perform identifier mapping by the third parameters determined through the first SIB and the second SIB.

In an embodiment, the determining unit 1220 is specifically configured to: if the third parameters determined through the first SIB and the second SIB are for a same carrier, the third parameters determined through the first SIB and the second SIB are mapped to a same identifier.

In an embodiment, the determining unit 1220 is specifically configured to: map the third parameters determined through the first SIB and the second SIB to different identifiers. 10193j In an embodiment, the determining unit 1220 is specifically configured to: if the third parameters determined through the first SIB and the second SIB are for different carriers, the third parameters determined through the first SIB and the second SIB are mapped to different identifiers.

In an embodiment, the terminal device supports performing the side-link communication in the first format and the second format, where the determining unit 1220 is specifically configured to: determine the third parameter corresponding to the first format and/or the second format according to the first SIB.

In an embodiment, the determining unit 1220 is specifically configured to: determine the second parameter corresponding to the second format according to the second SIB; or determine the third parameters corresponding to first format and the second format according to the second SIB.

It should be understood that the terminal device 1200 according to the embodiment of the present application may correspondingly perform the method 800 in the embodiment of the present application, and the foregoing and other operations and/or functions of the units in the terminal device 1200 are respectively for implementing the corresponding processes of the terminal devices in the methods in FIG. 7 and FIG. 8, and are not described herein for brevity.

Therefore, in the embodiment of the present application, the terminal device receives the first SIB and/or the second SIB transmitted by the network device, the terminal device may support performing side-link communication in one or more formats, and the terminal device may determine the corresponding at least one parameter according to the received first SIB and/or the received second SIB, and perform side-link communication according to the at least one parameter, so that the network device broadcasts different values of a parameter in different formats through the SIB, and enables the terminal device supporting different formats to obtain corresponding parameters, thereby implementing flexible parameter configuration.

Figure 13:
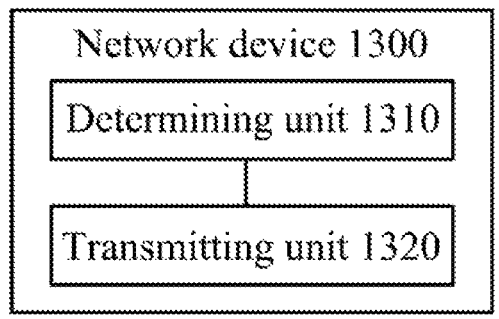
FIG. 13 is a schematic block diagram of a network device according to still another embodiment of the present application.

As shown in FIG. 13, the network device 1300 according to an embodiment of the present application includes: a determining unit 1310 and a transmitting unit 1320.

Specifically, the determining unit 1310 is configured to: determine parameter information of a terminal device, where the terminal device supports performing side-link communication in a first format and a second format, and the parameter information includes at least one parameter for the terminal device to perform the side-link communication in the first format and the second format; the transmitting unit 1320 is configured to: transmit the parameter information to the terminal device, where the parameter information is used by the terminal device to determine the at least one parameter.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

It should be understood that the network device 1300 according to the embodiment of the present application may correspondingly perform the method 900 in the embodiment of the present application, and the foregoing and other operations and/or functions of the respective units in the network device 1300 are respectively for implementing the corresponding processes of the network device in the methods in FIG. 9 and FIG. 10, and is not described here for brevity.

Therefore, in the embodiment of the present application, the network device transmits the parameter information to the terminal device, where the terminal device can support performing side-link communication in the first format and the second format, and correspondingly, the parameter information includes the parameter corresponding to the first format and the parameter corresponding to the second format of the terminal device, so that the terminal device can determine the parameters corresponding to the two formats according to the parameter information, thereby enabling the terminal device to select different formats to work, and adopt corresponding parameters.

Figure 14:
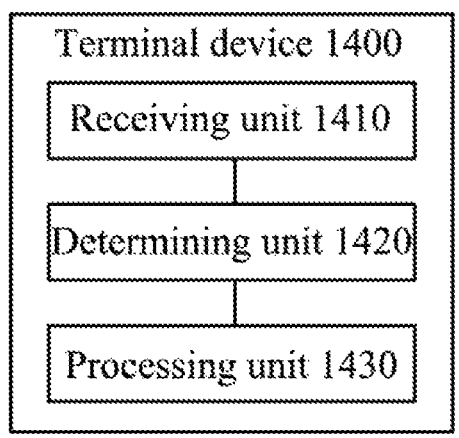
FIG. 14 is a schematic block diagram of a terminal device according to still another embodiment of the present application.

As shown in FIG. 14, the terminal device 1400 according to an embodiment of the present application includes: a receiving unit 1410 and a determining unit 1420, and in an embodiment, a processing unit 1430.

Specifically, the receiving unit 1410 is configured to: receive parameter information transmitted by a network device, where the terminal device supports performing side-link communication in a first format and a second format, and the parameter information includes at least one parameter for the terminal device to perform the side-link communication in the first format and the second format; the determining unit 1420 is configured to: determine, according to the parameter information, at least one parameter corresponding to the first format and at least one parameter corresponding to the second format.

In an embodiment, the at least one parameter includes at least one of the following: a side-link working frequency, a receiving resource pool parameter, a transmitting resource pool parameter, a synchronization reference signal, a synchronization resource parameter, a resource selecting parameter, or a layer one configuration parameter.

In an embodiment, the processing unit 1430 is configured to: select the at least one parameter corresponding to the first format or the at least one parameter corresponding to the second format, and perform the side-link communication.

It should be understood that the terminal device 1400 according to the embodiment of the present application may correspondingly perform the method 1000 in the embodiment of the present application, and the foregoing and other operations and/or functions of the units in the terminal device 1400 are respectively for implementing the corresponding processes of the terminal devices in the methods in FIG. 9 and FIG. 10, and are not described herein for brevity. 1020$j$ Therefore, in the embodiment of the present application, the terminal device receives the parameter information transmitted by the network device, and the terminal device can support performing side-link communication in the first format and the second format, and correspondingly, the parameter corresponding to the first format and the parameter value corresponding to the second format are included the parameter information, so that the terminal device can determine the parameters corresponding to the two formats according to the parameter information, thereby enabling the terminal device to select different formats to work and adopt corresponding parameters.

Figure 15:
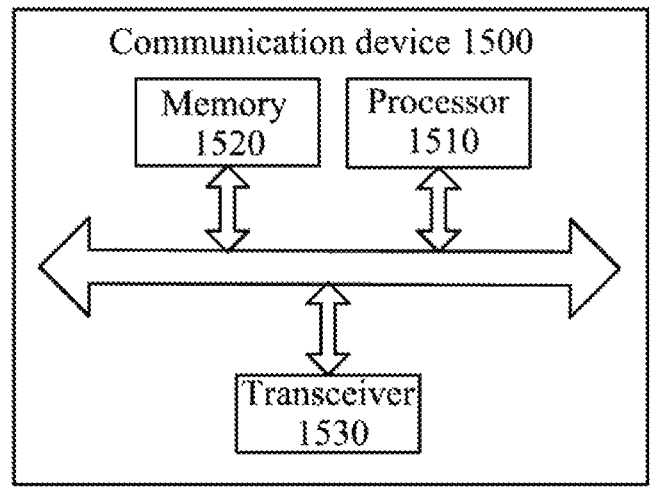
FIG. 15 is a schematic block diagram of a communication device according to an embodiment of the present application.

FIG. 15 is a schematic structural diagram of a communication device 1500 according to an embodiment of the present application. The communication device 1500 shown in FIG. 15 includes a processor 1510 that can call and run a computer program from a memory to implement the methods in the embodiments of the present application.

As shown in FIG. 15, the communication device 1500 may further include a memory 1520. The processor 1510 can call and run a computer program from the memory 1520 to implement the methods in the embodiments of the present application.

The memory 1520 may be a separate device independent of the processor 1510 or may be integrated in the processor 1510.

As shown in FIG. 15, the communication device 1500 may further include a transceiver 1530. The processor 1510 may control the transceiver 1530 to communicate with a further device, in particular, may transmit information or data to the further device, or receive information or data transmitted by the further device.

The transceiver 1530 may include a transmitter and a receiver. The transceiver 1530 may further include an antenna, and the number of the antennas may be one or more.

In an embodiment, the communication device 1500 may be the network device in the embodiment of the present application, and the communication device 1500 may implement a corresponding process implemented by the network device in each method of the embodiment of the present application, and details will not be described herein again for brevity.

In an embodiment, the communication device 1500 may be the terminal device in the embodiment of the present application, and the communication device 1500 may implement a corresponding process implemented by the terminal device in each method of the embodiment of the present application, and details will not be described herein again for brevity.

Figure 16:
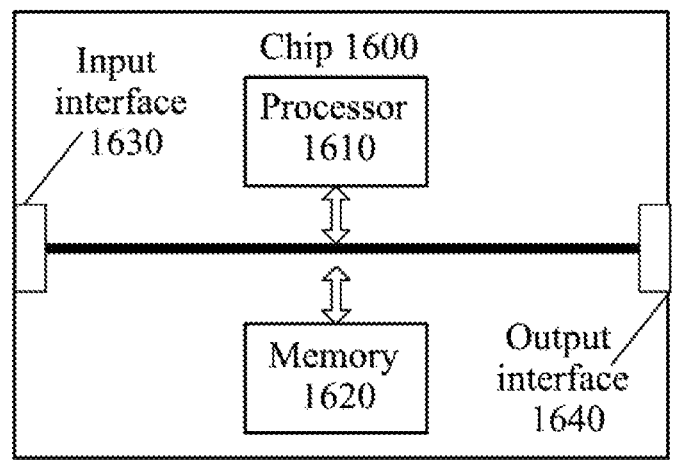
FIG. 16 is a schematic block diagram of a chip according to an embodiment of the present application.

FIG. 16 is a schematic structural diagram of a chip according to an embodiment of the present application. The chip 1600 shown in FIG. 16 includes a processor 1610 that can call and run a computer program from a memory to implement the methods in the embodiments of the present application.

As shown in FIG. 16, the chip 1600 may further include a memory 1620. The processor 1610 can call and run a computer program from the memory 1620 to implement the methods in the embodiments of the present application.

The memory 1620 may be a separate device independent of the processor 1610 or may be integrated in the processor 1610.

In an embodiment, the chip 1600 may further include an input interface 1630. The processor 1610 may control the input interface 1630 to communicate with a further device or chip. Specifically, information or data transmitted by the further device or chip may be acquired.

In an embodiment, the chip 1600 may also include an output interface 1640. The processor 1610 may control the output interface 1640 to communicate with a further device or chip. Specifically, information or data may be output to the further device or chip.

In an embodiment, the chip can be applied to the network device in the embodiment of the present application, and the chip may implement a corresponding process implemented by the network device in each method of the embodiment of the present application, and details will not be described herein again for brevity.

In an embodiment, the chip can be applied to the terminal device in the embodiment of the present application, and the chip may implement a corresponding process implemented by the terminal device in each method of the embodiment of the present application, and details will not be described herein again for brevity.

It should be understood that the chip mentioned in the embodiments of the present application may also be referred to as a system level chip, a system chip, a chip system or a system on chip.

It is to be noted that the method embodiments of the present application may be applied to a processor or implemented by the processor. The processor may be an integrated circuit chip, and has a signal processing capability. In an implementation process, each step of the method embodiments may be implemented by an integrated logic circuit of hardware in the processor or instructions in a software form. The processor may be a universal processor, a digital signal processor (DSP), an application specific integrated circuit (ASIC), a field programmable gate array (FPGA) or another programmable logic device, discrete gate or transistor logic device and discrete hardware component. Each method, process and logic block diagram disclosed in the embodiments of the present application may be implemented or executed. The universal processor may be a microprocessor or any conventional processor or the like. The steps of the method disclosed in the embodiments of the present application may directly be embodied as executable and implementable with a hardware decoding processor or with a combination of hardware and software module in the decoding processor. The software module may be located in a storage medium well known in the art such as a random memory, a flash memory, a read-only memory, a programmable read-only memory, or an electrically erasable programmable read-only memory or a register. The storage medium is located in a memory. The processor reads information in the memory, and implements the steps of the methods in combination with its hardware.

It will be appreciated that the memory in the embodiments of the present application may be a volatile memory or a non-volatile memory, or may include both volatile and non-volatile memories. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM) or a flash memory. The volatile memory may be a random access memory (RAM), and serves as an external high-speed cache. Exemplarily but unlimitedly, various forms of RAMs may be available, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (synchlink DRAM, SLDRAM) and a direct rambus random access memory (direct rambus RAM, DR RAM). It is to be noted that the memory for the system and method described in the present disclosure is intended to include, but not limited to, these memories and any other suitable memories.

Those skilled in the art may realize that the unit and algorithm processes of each example described in the embodiments disclosed in the present disclosure may be implemented by electronic hardware or a combination of computer software and the electronic hardware. Whether to realize these functions by hardware or software depends to specific application and design constraints of the technical solutions. Those skilled in the art may realize the described functions for each specific application by different methods, but such realization shall not be beyond the scope of the present disclosure.

It may be known to persons of ordinary skill in the art that, the units and the algorithm steps of each example that are described with reference to the embodiments disclosed herein may be implemented by electronic hardware or a combination of electronic hardware and computer software. The situation whether these functions are performed by hardware or software depends on specific applications and design constraints of the technical solutions. Persons skilled in the art may implement the described functions by using different methods for each specific application, and such implementation should not be regarded as going beyond the scope of the present application.

Those skilled in the art may clearly know that, for specific working processes of the systems, devices and units described above, reference may be made to the corresponding processes in the method embodiments and details will not be described herein again for the sake of convenient and brief description.

In several embodiments provided in the present application, it will be appreciated that the disclosed systems, devices and methods may be implemented in another manner. For example, the device embodiment described above is only illustrative. For example, division of the units is only division of logic functions, and other division manners may be adopted during a practical implementation. For example, multiple units or components may be combined or integrated into another system, or some characteristics may be omitted or not executed. In addition, mutual couplings or direct couplings or communication connections shown or discussed may be implemented through some interfaces. The direct couplings or communication connections between the devices or units may be implemented in electrical, mechanical or in other forms.

The abovementioned units described as separate parts may or may not be physically separated. The parts displayed as units may or may not be physical units, namely, the parts may be located in the same place, or may be distributed to multiple network units. Part or all of the units may be selected, according to a practical requirement, to achieve the objectives of the schemes in the embodiments.

In addition, each function unit in each embodiment of the present application may be integrated into a processing unit, each unit may also physically exist independently, and two or more units may also be integrated into a unit.

When implemented in form of software function unit and sold or used as an independent product, the functions may be stored in a computer-readable storage medium. Based on such an understanding, the technical solutions of the present application substantially or the part making contributions to the prior art or part of the technical solutions may be embodied by a software product, and the computer software product is stored in a storage medium, including a plurality of instructions for enabling computer equipment (which may be a personal computer, a server, network equipment or the like) to execute all or part of steps of the method in each embodiment of the present application. The abovementioned storage medium includes various media capable of storing program codes such as a USB flash disk, a mobile hard disk, an ROM, an RAM, a magnetic disk or an optical disk.

The above is only specific implementations of the present application and not intended to limit the scope of protection of the present application. Any variations or replacements apparent to those skilled in the art within the technical scope disclosed in the present application shall fall into the scope of protection of the present application. Therefore, the scope of protection of the present application shall be subject to the scope of protection of the claims.

What is claimed is:

1. A terminal device, comprising a transceiver, a processor and a memory, wherein
the transceiver is configured to receive a first system information block (SIB) and a second SIB transmitted by a network device; and
the memory has executable instructions stored thereon that when executed by the processor cause the processor to determine at least one parameter in side-link communication according to the received first SIB and the received second SIB and determine, according to the received first SIB and the received second SIB, at least one receiving resource pool in multiple receiving resource pools allocated by the network device, wherein the multiple receiving resource pools are used by the terminal device to receive data transmitted by a further terminal device;
wherein the transceiver is further configured to receive dedicated radio resource control (RRC) signaling transmitted by the network device, wherein the dedicated RRC signaling is used to indicate a further receiving resource pool in the multiple receiving resource pools, and a synchronization reference corresponding to the further receiving resource pool is different from a synchronization reference corresponding to the at least one receiving resource pool;

wherein the processor is configured to:
determine third parameters in the at least one parameter according to the received first SIB and the received second SIB, wherein the third parameters comprise a side-link working frequency; and
perform identifier mapping according to the third parameters determined through the first SIB and the second SIB, wherein the third parameters determined through the first SIB and the second SIB are mapped to a same identifier if the third parameters determined through the first SIB and the second SIB are for a same carrier; or the third parameters determined through the first SIB and the second SIB are mapped to different identifiers if the third parameters determined through the first SIB and the second SIB are for different carriers.

2. The terminal device according to claim 1, wherein the at least one parameter further comprises at least one of the following:
a receiving resource pool parameter, a transmitting resource pool parameter, a synchronization reference signal, a synchronization resource parameter, a resource selecting parameter, or a layer one configuration parameter.

3. The terminal device according to claim 1, wherein the terminal device only supports performing the side-link communication in a first format.

4. The terminal device according to claim 1, wherein the terminal device supports performing the side-link communication in a first format and a second format.

5. The terminal device according to claim 1, wherein the processor is configured to:
determine a first parameter in the at least one parameter according to the received first SIB.

6. The terminal device according to claim 5, wherein the processor is configured to:
after determining the first parameter in the at least one parameter according to the received first SIB, perform identifier mapping only according to the first parameter determined through the first SIB.

7. The terminal device according to claim 1, wherein the processor is configured to:
determine a second parameter in the at least one parameter according to the received second SIB.

8. The terminal device according to claim 7, wherein the processor is configured to:
after determining the second parameter in the at least one parameter according to the received second SIB, perform identifier mapping only according to the second parameter determined through the second SIB.

9. The terminal device according to claim 1, wherein the terminal device supports performing the side-link communication in a first format and a second format,
wherein the processor is configured to:
determine the third parameters corresponding to the first format and/or the second format according to the first SIB.

10. A method for parameter configuration, comprising:
receiving, by a terminal device, a first system information block (SIB) and a second SIB transmitted by a network device;
determining, by the terminal device, at least one parameter in side-link communication according to the received first SIB and the received second SIB;
determining, by the terminal device, according to the received first SIB and the received second SIB, at least one receiving resource pool in multiple receiving resource pools allocated by the network device, wherein the multiple receiving resource pools are used by the terminal device to receive data transmitted by a further terminal device; and receiving, by the terminal device, dedicated radio resource control (RRC) signaling transmitted by the network device, wherein the dedicated RRC signaling is used to indicate a further receiving resource pool in the multiple receiving resource pools, and a synchronization reference corresponding to the further receiving resource pool is different from a synchronization reference corresponding to the at least one receiving resource pool;

wherein the determining, by the terminal device, at least one parameter in side-link communication according to the received first SIB and the received second SIB comprises:

determining, by the terminal device, third parameters in the at least one parameter according to the received first SIB and the received second SIB, wherein the third parameters comprise a side-link working frequency;

wherein the method further comprises: performing, by the terminal device, identifier mapping according to the third parameters determined through the first SIB and the second SIB, which comprises:

mapping, by the terminal device, the third parameters determined through the first SIB and the second SIB to a same identifier if the third parameters determined through the first SIB and the second SIB are for a same carrier; or mapping, by the terminal, the third parameters determined through the first SIB and the second SIB to different identifiers if the third parameters determined through the first SIB and the second SIB are for different carriers.

11. The method according to claim 10, wherein the at least one parameter further comprises at least one of the following:

a receiving resource pool parameter, a transmitting resource pool parameter, a synchronization reference signal, a synchronization resource parameter, a resource selecting parameter, or a layer one configuration parameter.

12. The method according to claim 10, wherein the terminal device only supports performing the side-link communication in a first format.

13. The method according to claim 10, wherein the terminal device supports performing the side-link communication in a first format and a second format.

14. The method according to claim 10, wherein the determining, by the terminal device, at least one parameter in side-link communication according to the received first SIB and the received second SIB further comprises:

determining, by the terminal device, a first parameter in the at least one parameter according to the received first SIB.

15. The method according to claim 14, wherein after the determining, by the terminal device, a first parameter in the at least one parameter according to the received first SIB, the method further comprises:

performing, by the terminal device, identifier mapping only according to the first parameter determined through the first SIB.

16. The method according to 10, wherein the determining, by the terminal device, at least one parameter in side-link communication according to the received first SIB and the received second SIB further comprises:

determining, by the terminal device, a second parameter in the at least one parameter according to the received second SIB.

17. The method according to claim 16, wherein after the determining, by the terminal device, a second parameter in the at least one parameter according to the received second SIB, the method further comprises:

performing, by the terminal device, identifier mapping only according to the second parameter determined through the second SIB.

18. The method according to claim 10, wherein the terminal device supports performing the side-link communication in a first format and a second format, wherein the determining, by the terminal device, third parameters in the at least one parameter according to the received first SIB and the received second SIB comprises:

determining, by the terminal device, the third parameters corresponding to the first format and/or the second format according to the first SIB.

* * * * *